(12) United States Patent
Sokel et al.

(10) Patent No.: US 8,209,200 B2
(45) Date of Patent: Jun. 26, 2012

(54) SYSTEM AND METHOD FOR SYNCHRONIZING PASSENGER NAME RECORD DATA

(75) Inventors: John Sokel, Streamwood, IL (US); Roger Liew, Chicago, IL (US); Michael J. Alford, Chicago, IL (US)

(73) Assignee: Orbitz LLC, Chicago, IL (US)

( * ) Notice: Subject to any disclaimer, the term of this patent is extended or adjusted under 35 U.S.C. 154(b) by 2034 days.

(21) Appl. No.: 10/097,795

(22) Filed: Mar. 13, 2002

(65) Prior Publication Data

US 2003/0177044 A1    Sep. 18, 2003

(51) Int. Cl.
G06Q 10/00    (2012.01)
(52) U.S. Cl. .......................................................... 705/5
(58) Field of Classification Search .................. 705/5
See application file for complete search history.

(56) References Cited

U.S. PATENT DOCUMENTS

| | | | | |
|---|---|---|---|---|
| 6,023,679 | A * | 2/2000 | Acebo et al. | 705/5 |
| 6,442,526 | B1 * | 8/2002 | Vance et al. | 705/5 |
| 2001/0053989 | A1 * | 12/2001 | Keller et al. | 705/5 |
| 2001/0054022 | A1 * | 12/2001 | Louie et al. | 705/38 |
| 2002/0152100 | A1 * | 10/2002 | Chen et al. | 705/5 |
| 2003/0023463 | A1 * | 1/2003 | Dombroski et al. | 705/5 |
| 2003/0225600 | A1 * | 12/2003 | Slivka et al. | 705/5 |

OTHER PUBLICATIONS

HP's E-Speak Software Nominated for Computerworld Smithsonian Award; E-Speak Recognized for Leading the Next Evolution of the Internet. Mar. 27, 2000. Business Wire, p0183.*

* cited by examiner

*Primary Examiner* — Shannon Campbell
(74) *Attorney, Agent, or Firm* — Edwards Wildman Palmer LLC

(57) ABSTRACT

A system and method are provided for maintaining updated passenger travel records across multiple system platforms. A network server is adapted to receive input data from a passenger including an indication that the passenger desires to purchase tickets or make reservations for travel related services. A booking engine acts to purchase the ticket or book the reservation and request and receive a copy of a passenger name record created by a global distribution system. The booking engine then forwards a copy of the received passenger name record to the database. The database is adapted to form an association between the received copy of the passenger name record and the input data received from the passenger, and store the copy of the passenger name record. The database may further perform a comparison between the input data and the received passenger name record to identify discrepancies.

12 Claims, 5 Drawing Sheets

SYSTEM AND METHOD FOR SYNCHRONIZING PASSENGER NAME RECORD DATA

BACKGROUND OF THE INVENTION

The present invention relates to a system and method for synchronizing travel related data across multiple independent system platforms. During the course of booking travel reservations and purchasing airline tickets or other travel related services, passenger data are created and stored on a number of independent data processing systems. For example, if airline tickets are purchased through a global distribution system (GDS) such as Worldspan, a passenger name record (PNR) is created on the GDS. The PNR includes information about the passenger or passengers who will be traveling on the ticket or tickets, the flight itinerary, the fare charged for tickets, and the like. Typically, the PNR created by the GDS is copied to the internal reservations and ticketing systems of the airline on which the tickets are purchased. Thus, the PNR data reside in at least two separate locations.

Travel data are further dispersed if a traveler books reservations or purchase tickets from additional travel service providers. For example, if in addition to purchasing airline tickets the traveler also books a hotel and reserves a rental car, much of the data in the PNR will be repeated on the reservation systems of the hotel and rental car companies. Further, the hotel and rental car reservations may also be booked through a GDS or GDS-like system dedicated to hotels, such as Pegasus, or a GDS or GDS-like system dedicated to rental cars. In this case, additional PNRs will be created for the hotel GDS and the rental car GDS, further increasing the number of independent systems on which the passenger's travel data will be stored. Much of the data stored on these various systems will be the same and often times and dates will likely overlap. Since these systems are generally independent of one another, discrepancy may exist between the data stored on different systems. This may lead to conflicts between the services to be provided by the various travel service providers. Conflicts may also arise when changes are made to the arrangements made with one travel service provider without considering the impact the changes will have on the services provided by the other travel service providers. A traveler's travel data may be updated on the reservations system of one travel service provider, while the reservations and ticketing systems of the other travel service providers remain unaware of the changes.

The advent of the internet and the world wide web has the potential to significantly alter the ways in which travel related services are distributed. Already the number of travel related web sites has proliferated. Most such web sites, however, have simply replicated the traditional travel agency model in the on-line environment. Rather than a customer contacting a travel agent by phone or in person, contact is made over the Internet. However, the remainder of the transaction proceeds along substantially the traditional course. The customer specifies the travel dates and the destination and the on-line travel agent processes the request in the same manner as a traditional travel agent.

More recently, however, new models have been developed for delivering travel related services over the internet. For example, in co-pending U.S. patent application Ser. No. 09/872,948 entitled "System and Method For Receiving and loading Fare and Schedule Data," assigned to the assignee of the present application, an on-line system for searching airline schedule and fare data and purchasing tickets over the internet is disclosed. According to this system, searches are performed on external databases independent of the GDS. The search results are forwarded directly to the customer's internet web browser, and the GDS is contacted only after the customers decides to purchase tickets. In addition to airline tickets, the system may be expanded to provide reservation and booking services for other travel service providers such as hotels, rental car companies, cruise lines and others. Thus, the system may be configured to provide a single site for booking all of a customer's travel requirements. However, with each additional travel service provider with whom services are booked, the potential for conflicts and discrepancy between the travel data created and stored on the various systems of each individual travel service provider is greatly increased.

Therefore, because of the potential for stale or conflicting data stored on the systems of different travel service providers if an on-line travel service providing reservations booking and ticket purchasing services for multiple travel service providers requires a mechanism for updating and correcting a customer's travel data across a number of different systems platforms operated by the various travel service providers. It is also desirable that an on-line travel system provides a mechanism whereby changes to a customer's travel data, including changes to the customer's itinerary, made by the internal systems of one travel service provider, are communicated to the internal systems other travel service providers with whom the customer has made travel arrangements. It is also desirable that such a system provide a central comprehensive record of all of a customer's travel arrangements. Such a comprehensive travel record may then be used to compare the services to be provided by the various travel service providers in order to identify conflicts. If conflicts are found, steps may be taken to resolve them.

SUMMARY OF THE INVENTION

The present invention relates to a system and method for synchronizing a passenger's travel data across multiple data processing platforms. The system and method of the present invention assure that data that are common to the data sets stored on different data processing systems under the control of different system operators remain the same, even after one or more of the various systems make changes to their own data sets.

An embodiment of the invention provides a system for synchronizing data related to a customer's travel requirements among a number of different travel services providers. A comprehensive travel record is created and stored on a central database. The comprehensive travel record includes data related to the travel services to be provided by all of the various travel service providers, such as airlines, hotels and rental car companies with which the customer has made travel arrangements. A booking engine in the form of a Booking Connectivity Server (BCS) server is provided to interface with the reservations and booking systems of the individual travel service providers and with the central database on which the comprehensive travel record is stored. The BCS server is configured to reserve and book travel services provided by the various travel service providers. The BCS server is further operative to receive updated data from the reservations and booking systems of the travel service providers relating to changes in the services to be provided. This change data is stored as updated data in the central database. The system updates the comprehensive travel record stored in the central database to reflect the changes in the travel services to be provided by a first travel service provider. The system then performs a data comparison to determine whether the updated data related to changes in the travel services to be provided by the first travel service provider affect the travel services to be provided by a second travel service provider. If so, the system implements a mechanism for changing or adjusting the travel services to be provided by the second travel service provider to accommodate the changes made to the travel services to be provided by the first travel service provider.

In addition to synchronizing the customer's travel data when changes are made to the services provided by one or more of the travel service providers, synchronization may also be performed at predefined intervals, or at the occurrence of other triggering events. For example, synchronization may take place immediately upon the purchase of an airline ticket, or the booking of a reservation for a hotel or rental car. Also, synchronization may take place whenever a customer requests to view his or her own travel data. Synchronizing each time a customer requests to view his or her data ensures that the customer will always be viewing the most up-to-date and accurate data.

In an embodiment of the invention at least one of the travel service providers is a commercial airline. The travel services provided by the airline include at least one flight segment. In another embodiment of the invention, at least one of the travel services providers is a hotel. In other embodiments of the invention, at least one of the travel services providers is a rental car company, or a restaurant, or a cruise line.

An alternate embodiment of the invention provides a data synchronization method for coordinating a passenger's travel requirements among a plurality of travel service providers. The method includes the step of maintaining a central database for storing a comprehensive travel record, wherein the comprehensive travel record includes data related to the travel services to be provided by the travel service providers. The method of this embodiment of the invention next involves receiving data indicating that a change has been made in the travel services to be provided by a first travel service provider. A determination is made whether the change in the travel services to be provided by the first travel service provider affect the travel services to be provided by a second travel service provider. If so, the travel services to be provided by the second travel service provider are changed or adjusted to accommodate the changes made to the travel services to be provided by the first travel service provider. All of the changes made to the customer's travel data are then stored in an updated comprehensive travel record stored in the central database. Again, the customer's travel data may also be synchronized based on other triggering events, such as the purchase or reservation of services, or by a customer request to view his or her travel data.

According to the method of this embodiment, at least one of the travel service providers is a commercial airline and the travel services provided by the airline include at least one flight segment. Alternatively, at least one of the travel service providers may include a hotel, a rental car company, a restaurant, a cruise line, or other service provider.

DETAILED DESCRIPTION OF THE INVENTION

The present invention relates to a system and method for synchronizing and maintaining up-to-date information related to a traveler's travel arrangements across multiple system platforms. Data related to a traveler's travel arrangements are stored in a comprehensive travel record in a central database, as well as on the internal reservations and ticketing systems of individual travel service providers such as airlines, hotels, car rental companies and restaurants. Travel data may also be stored in a passenger name record (PNR) created on a global distribution system (GDS) such as Worldspan or Sabre. In each case, the individual systems on which the data are stored can access the data and manipulate and change the data as necessary to suit their own requirements, as well as in response to traveler requests to alter their travel arrangements. The present invention provides both a system and a method for receiving a traveler's travel data from individual travel service providers and synchronizing the received data with the travel data stored in the system's central database. In the various embodiments of the invention described below, automatic rebooking or conflict alerts may be provided when the various travel services booked with multiple travel service providers are in conflict with one another.

Figure 1:
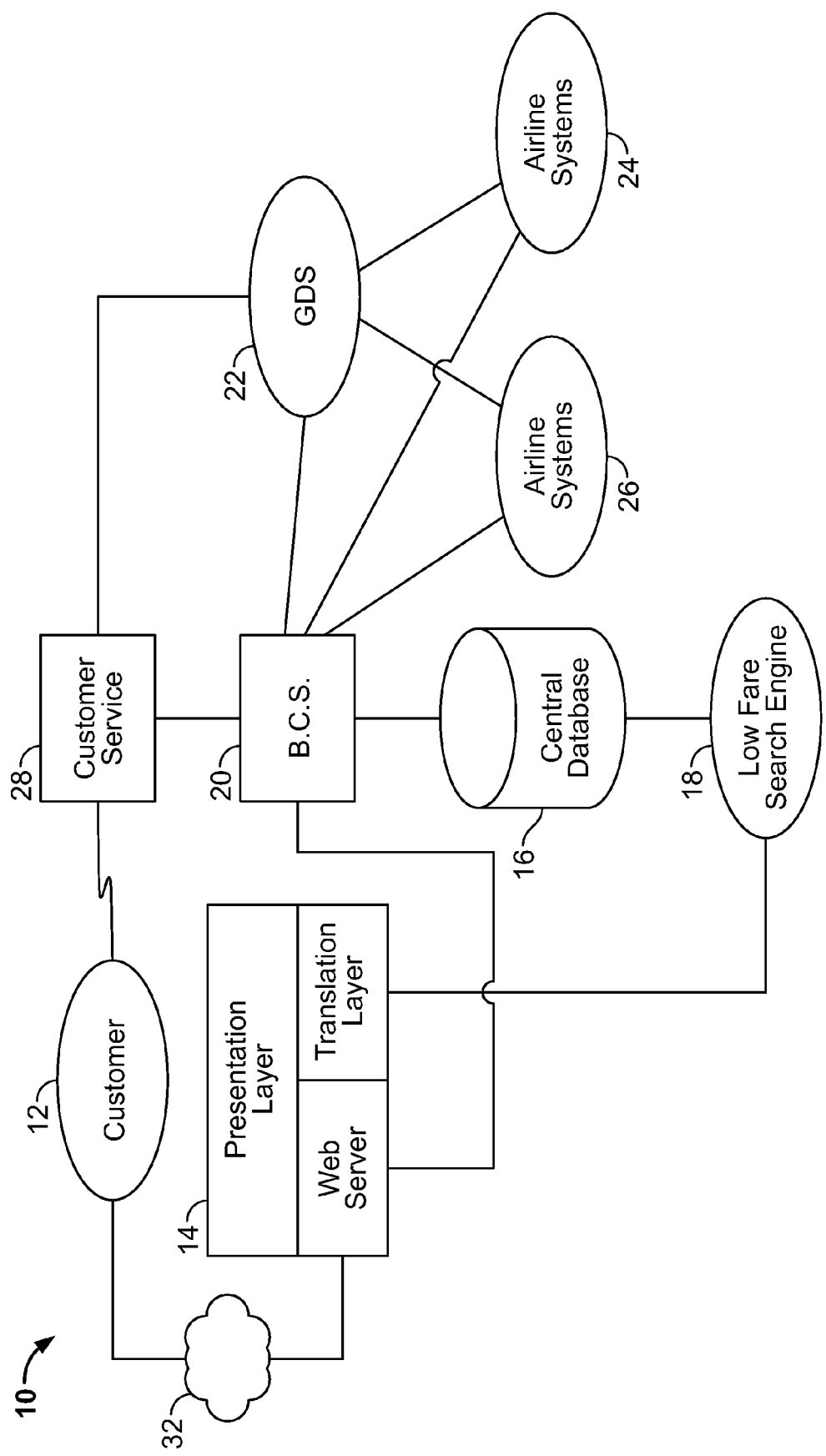
FIG. 1 is a block diagram of a system for synchronizing travel data according to a first embodiment of the invention.

A system 10 for purchasing airline tickets according to a first embodiment of the invention is shown in FIG. 1. The components of the system 10 include a central database 16 and a Booking Connectivity Server (BCS) server 20. The BCS server 20 interfaces with a Global Distribution System (GDS) 22 such as Worldspan, Galileo, or Sabre, and operates as a booking engine for reserving and purchasing tickets through the GDS. The BCS server 20 also interfaces directly with the reservations and ticketing systems of individual airlines such as airline systems 24 and 26. In addition to interfacing with the GDS and the internal systems of the individual airlines 24, 26, the BCS server 20 also interfaces with a network web server 14 and with the central database 16. A customer 12 interacts with the system 10 over the network 32 via the network server 14. Thus, the system 10 allows customers to purchase tickets directly over a computer network 32, such as the Internet.

In order to more fully appreciate the data synchronization features of the present invention it is first necessary to understand the ticketing process implemented by system 10. A customer begins the process of purchasing airline tickets by contacting the network web server 14 over the computer network 32. The network web server 14 operates an interactive travel web site dedicated to identifying available airline flights and their associated fares and allowing customers to purchase tickets through the web site. The web server 14 downloads the travel web site to the customer for display by the customer's web browser. The customer 12 then submits a travel request to the web server 14 by entering data into various data fields found on the interactive web page displayed by the customer's web browser. The data forming the travel request may include the origin and destination of a planned trip, travel dates, and the time of day the customer would like to travel. The network server 14 receives the travel request, parses the data submitted by the customer, and translates the search request into a query format accepted by a Low Fare Search (LFS) engine 18. The LFS engine 18 is a system for searching airline schedule, fare, and availability data in order to identify flights that meet a customer's search requirements. Preferably the LFS engine 18 is a cache based system such as that described in a co-pending patent application Ser. No. 09/872,948 entitled "System and Method For Receiving and Loading Fare and Schedule Data" filed Jun. 1, 2001 and assigned to the assignee of the present invention. The teaching of co-pending application Ser. No. 09/872,948 is incorporated herein by reference. In an alternative arrangement, the flight schedule, availability and fare data may be searched directly on a GDS 22 through the BCS server 20. However, as described in the above mentioned co-pending application, the search results returned by the LFS engine 18 are more complete than the search results provided by a GDS 22.

In any case, whether available fares are searched on LFS engine 18 or directly on a GDS 22, the results of the search are returned to the network server 14 in the form of a list of flights meeting the passenger's travel requirements and their associated fares. The web server 14 translates the data from the LFS engine 18 or GDS 22 and sends the translated data to the customer over the computer network 32. The data are displayed by the customer's web browser in a format easily evaluated by the customer. The customer may then elect to purchase one or more tickets for one or more of the flights identified by the search. The web server 14 receives the request to purchase tickets and forwards the request to the BCS server 20. The BCS server 20 in turn establishes a connection with a GDS 22, such as Worldspan, books a reservation for the appropriate number of seats on the selected flight or flights, and simultaneously executes a ticket purchase for the reserved seats.

The GDS 22 creates an internal Passenger Name Record (PNR) whenever a reservation is booked. The PNR includes all of the relevant information regarding the reservation, including but not limited to, the customer's name, the names of others traveling with the customer, if any, the flight numbers comprising the customer's itinerary, the fare associated with the reservation, and so forth. It must be noted that when a ticket is purchased through the system 10, the reservation and purchase are placed with the GDS through the BCS server 20. All of the data that become the PNR originate or pass through the BCS server 20. As will be discussed in more detail below, the data accumulated by the BCS server 20 serve as the basis for a comprehensive travel record detailing all of a customer's travel arrangements. The BCS server 20 interfaces with the central database 16 to store the comprehensive travel record. The comprehensive travel record is analogous to the PNR created in the GDS 22, but may include additional information not found in the PNR. In this first embodiment, however, where the only services purchased through the system 10 are airline tickets, the data in the comprehensive travel record will be substantially identical to the data stored in the PNR created on the GDS 22. The GDS 22 includes a direct link to the internal reservations and ticketing systems of the airlines 22, 24. When the BCS server 20 indicates that the passenger desires to purchase the ticket or tickets held by a reservation, the GDS 22 sends a copy of the PNR to the airline's internal reservations and ticketing systems. (In the preferred embodiment of the system 10, the ticket purchase is executed simultaneously with the creation of the reservation.) Upon receiving the copy of the PNR, the airline's internal reservations and ticketing systems reserve space on the corresponding flight or flights.

A consequence of the ticket purchasing process just described is that data representing the customer's travel arrangements are created and stored at multiple locations. Passenger data are sent to the BCS server 20 from the network server 14. The PNR, which also contains passenger data and flight data, is created and stored on the GDS. A copy of the of the PNR data is sent to the airline's internal ticketing systems, and a copy of the data accumulated by the BCS 20 is stored as the comprehensive travel record in the central database 16. Thus, essentially the same data set or portions thereof can be found in three or four separate locations. This opens the possibility for discrepancies, as one or more of the different systems having access to the data may alter or change the data without informing the other systems. For example, suppose a ticket is booked on the airline having airline reservations and ticketing systems 26 in FIG. 1. Suppose further that the airline makes a schedule change changing the departure time of a flight booked by customer 12. The airline's internal systems will reflect the updated departure time, but the other systems, namely the GDS 22, and the comprehensive travel record stored in the central database 16 will not. Thus, the data stored in these other systems are "stale", or not current.

The system and method of the present invention prevent stale data from accumulating by performing a data synchronization function between the various components of the system that store copies of the same data. The data synchronization function may be carried out at regular timed intervals or upon the occurrence of certain predefined events, such as the cancellation or rescheduling of a flight, or when a passenger 12 requests to view or make changes to his or her travel itinerary.

Figure 2:
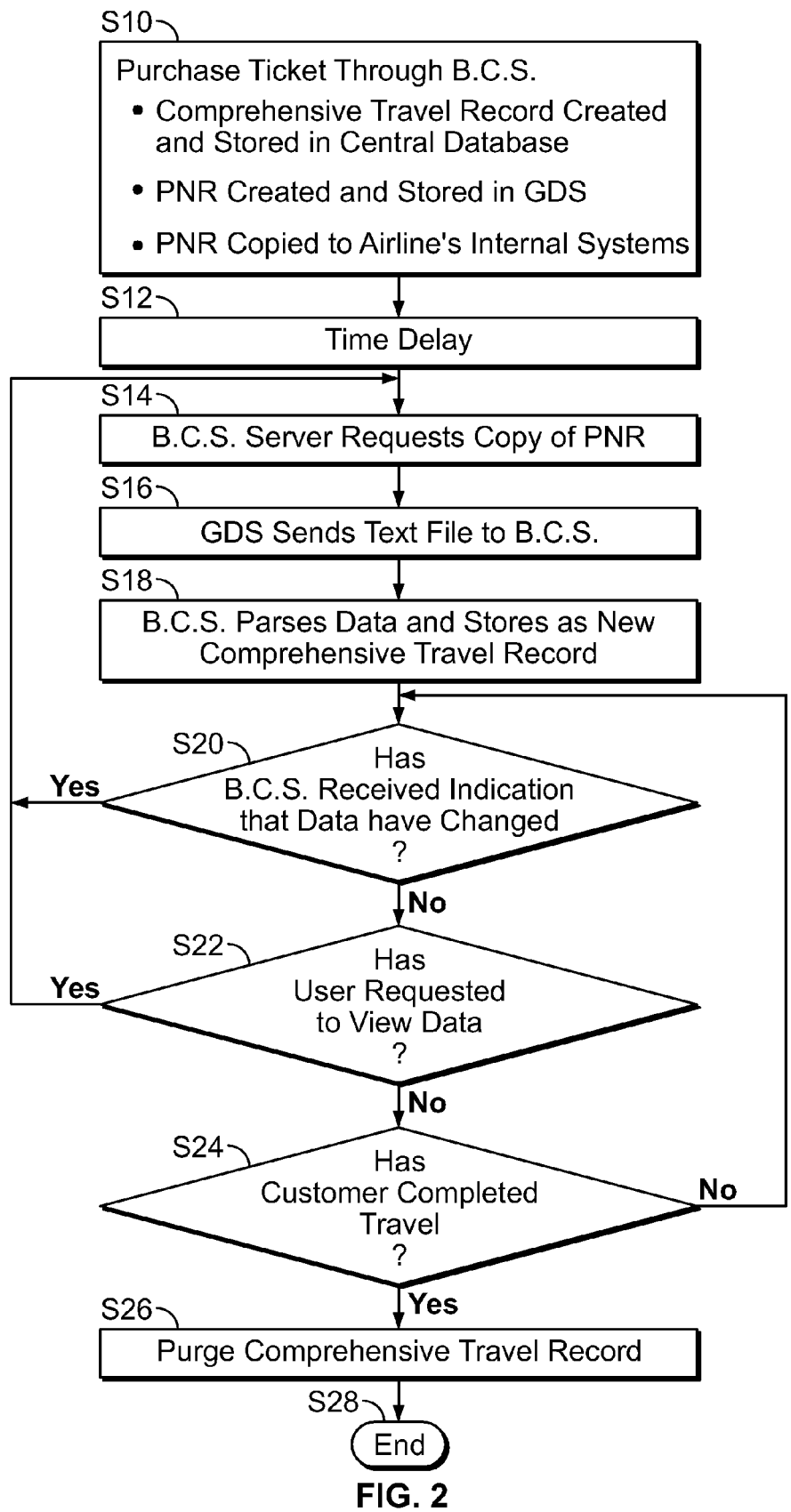
FIG. 2 is a flowchart of a method for synchronizing travel data according to the embodiment of the invention.

A method for synchronizing a customer's travel data between the comprehensive travel record stored in the central database 16, the PNR created and stored on the GDS 22, and the PNR data copied to an airline's internal reservations and ticketing systems such as airline 26, is depicted in the flow chart of FIG. 2. FIG. 2 will be described in conjunction with the block diagram of system 10 shown in FIG. 1. The data synchronization method begins at step S10 where an airline ticket is purchased through the system 10, as has been described. When the ticketing process of step S10 is completed, a comprehensive travel record will have been created and stored in the central database 16; a PNR will have been created and stored in the GDS 22; and a copy of the PNR will have been written to the internal reservations and ticketing systems of the airline 26. All of the data stored in these locations will be substantially the same, although it may be stored in different formats. The data may include information such as passenger names, addresses, and other passenger identification information, itinerary information, including flight numbers, departure and arrival times, originating and destination airports, and fare data.

It should be noted that the sources for the data that are stored in the comprehensive travel record, the PNR and the PNR data stored on the airline's internal systems are different. For example, the comprehensive travel record receives flight data through the BCS 20, which in turn receives the flight data from a LFS engine 18. The PNR created in the GDS, on the other hand, receives flight data from its own internal database which is updated with fresh data from the airlines on a periodic basis. The flight data available to the airlines' systems, however, may be updated nearly instantaneously as soon as new schedules and fares are made available. Thus, the customer's comprehensive travel record stored in the central database 16, the PNR stored in the GDS 22, and the customer's flight data stored on the airline's internal reservations and ticketing systems may each indicate that a passenger is booked on a particular flight, say flight 715, but the comprehensive travel record may include data that indicates that flight 715 departs at 9:15 A.M., whereas the PNR stored in the GDS, which has more up-to-date information, may indicate that flight 715 departs at 8:50. A passenger relying on the stale data in the comprehensive travel record stored in the database 16 could conceivably miss the flight due to such faulty information.

In order to ensure that the data in the comprehensive travel record is in accord with the PNR data when a ticket is purchased, a first data synchronization is carried out. A short delay, step S12, is built into the process in order to allow all of the systems to complete the ticketing process after a ticket has been purchased. The time delay may be on the order of ten minutes or some other appropriate time period. After the time delay, the BCS 20 sends a message to the GDS requesting the PNR data at step S14. The message may take the form DISPLAY PNR <PNRID #> where PNR ID# is the identification number of the PNR which the BCS 20 is requesting. Upon receiving the DISPLAY PNR request, the GDS 22 sends the PNR data to the BCS 20 in step S16. The PNR data is transferred to the BCS 20 in the form of a text file with various markup codes identifying the data fields embedded within the text. At step S18 the BCS 20 parses the received text file and stores the data as a new comprehensive travel record, superceding the data originally stored in the comprehensive travel record. Thus, at this point in the process it is assured that the data contained in the comprehensive travel record matches that of the PNR.

Nonetheless, changes can still be made to the data stored either in the comprehensive travel record, the PNR or the PNR data stored on the airline's internal systems. For example the airline may cancel the flight or adjust the departure or arrival time, or the customer may wish to make changes to his or her travel plans. Therefore, a determination is made at step S20 whether the BCS 20 has received an indication that the data stored in any of the other systems have changed. (The mechanisms for receiving such an indication are discussed below.) If it is determined at step S20 that the data have changed, the method returns to step S14 and steps S14, S16 and S18 are repeated to again synchronize the comprehensive travel record data and the PNR data. If, however, at step S20 there is no indication that the PNR data have changed, then step S22 is executed. At step S22 a determination is made whether the customer has requested to view the data in comprehensive travel record. If the customer has made such a request the method again returns to step S114 and steps S14, S16 and S18 are repeated to re-synchronize the comprehensive travel record data and the PNR data. Re-synchronizing the data each time the customer requests to view the data ensures that the customer always views fresh, up-to-date information. It should be noted, however, that re-synchronizing the data each time the user requests to view his or her travel arrangements may overtax system resources. In that case step S22 may be omitted, or step S22 may be exercised only if data have not been resynchronized within some preset time period.

In any case, if at step S22 there is no indication that the customer has made a request to view the comprehensive travel record, or if step S22 is omitted, process flow moves on to step S24. At step S24 a determination is made whether the customer has completed his or her travel. If yes, step S26 is executed and the customer's comprehensive travel record is purged from the database of active comprehensive travel records or are otherwise archived so that re-synchronizing the data no longer occurs. Upon the execution of step S26 the synchronization method ends at step S28. If, however, it is determined at step S24 that the customer has not completed his or her travel, the method returns to step S20. Steps S20 and S22 are continuously repeated until the customers travel is completed. Thus, the data stored in the comprehensive travel record and the PNR are continually re-synchronized each time a change is made to the data, and each time the customer views the data if step S22 is applied, until such time as the customer completes his or her travel.

The system 10 of FIG. 1 includes a customer service center 28 which augments the system 10 operator's network presence. The customer service center 28 may be a telephone call center where customers such as customer 12 can call to speak with agents of the system 10 operator in order to make changes to the customer's travel arrangements or to deal with other problems the customer may have in finalizing his or her travel plans. In the event that a customer calls the customer service center to make changes to his or her air travel itinerary, an agent at the customer service center 28 initiates a session with the GDS 22 in the same manner as a traditional travel agent would, namely through a dedicated terminal linked directly to the GDS. After determining whether alternate flights are available meeting the customer's changed requirements, the agent books the new tickets and cancels the old one, either creating a new PNR in the process or amending the data in the previously existing PNR in the process. In either case, the updated PNR data is copied to the affected airline's internal reservations and ticketing systems. At this point in the process, the BCS 20 has not been updated with the new information and the comprehensive travel record stored in the central database 16 does not match the data in the PNR of the data stored in the airline's systems. However, since the customer service center 28 is under the control of the operator of the system 10 it is a relatively simple matter to establish a mechanism whereby the BCS 20 is contacted whenever an agent at the customer service center 28 makes a change to a customer's PNR data on the GDS 22. Such a communication from the customer service center 28 to the BCS 20 corresponds to block 20 in the flow chart of FIG. 2. Thus when an agent at customer service center 28 makes a change to a customers itinerary, a positive determination is made at step S20 that the customer's travel data have changed. Consequently, a PNR synchronization is initiated.

Another way by which data stored in the comprehensive travel record may become stale is if the airline makes changes scheduled to the flight data which affect the customer's travel itinerary and such changes are not communicated to the GDS 22 or to the BCS 20. It may be desirable to resynchronize data only when permanent schedule change has been implemented for the affected flight number, or in some cases it may also be desirable to re-synchronize in the face of operational changes such as delayed or canceled flights. A number of options are available for communicating such changes back to the GDS 20. A first solution would be to simply provide a direct signal from the airline's reservations and ticketing systems 24, 26 to the BCS 20 indicating that a change has been made to a customer's travel data. However, this solution may unduly burden the airline's reservations and ticketing systems, and the airlines may not agree to making the necessary changes to their own systems to accommodate this feature. Therefore, another solution would be to receive periodic block updates from the airlines, or individualized updates at pre-selected times before a customer's flights. Yet another solution would be for the operator of system 10 to sign up for a subscriber notification system run by the airline on the customer's behalf. In some case, the operator of the system 10 may wish to provide travel updates to the customer 12. Such updates may include messages indicating the weather conditions at the customer's destination, flight status, and the like. It may be desirable to re-synchronize a customer's data prior to sending such messages. In order to insure the accuracy and appropriateness of such messages.

Figure 3:
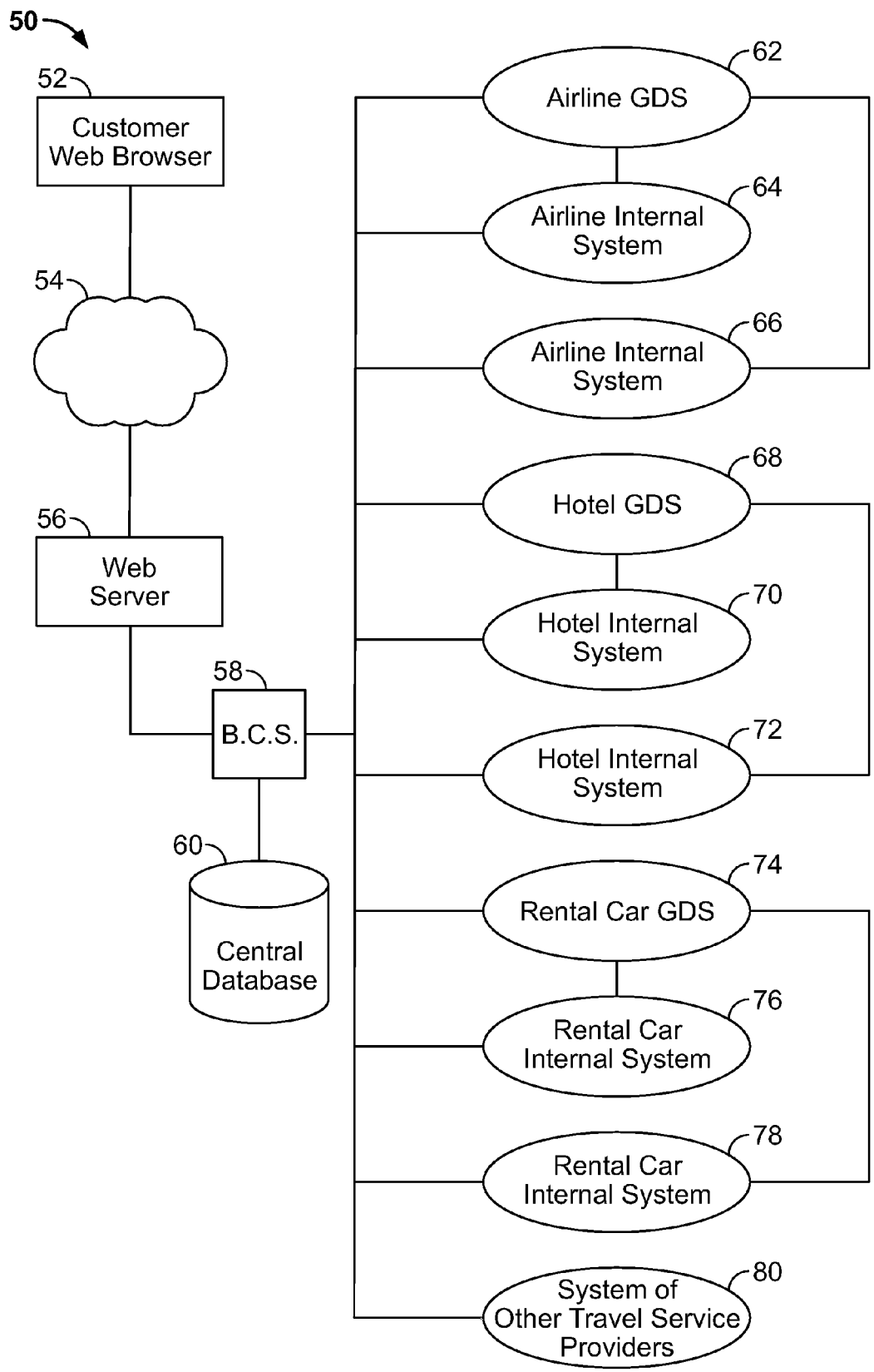
FIG. 3 is a block diagram of a system for synchronizing travel data according to a second embodiment of the invention.

A second embodiment of a system for purchasing travel related services according to the present invention is shown at 50 in FIG. 3. In essence, the system 50 is the same system as system 10 of FIG. 1, but expanded to include multiple travel service providers in addition to airlines. System 50 includes a customer's web browser 52 connected to a network web server 56 through a computer network 54 such as the internet. The web server 56 is connected with a BCS server 58, which in turn is connected with a central database 60, all as previously described in the embodiment of FIG. 1. A significant difference between the system 10 of FIG. 1 and the system 50 of FIG. 3 is that, in addition to interfacing with a GDS 62 for booking airline tickets and with the airline's internal reservations and ticketing systems 64, 66, the BCS server 58 of system 50 also interfaces with a GDS or GDS-like system 68 for procuring hotel reservations; individual hotel reservations systems 70, 72; a rental car GDS or GDS-like system 74, individual rental car companies' reservations systems 76, 78; as well as the reservations and ticketing systems of other travel services providers 80.

A difficulty with a system such as system 50 is that data representing a customer's travel arrangements are spread out and stored on the system platforms of many different travel service providers. Changes can be made to the services to be provided by one service provider which impact on the services to be provided by another service provider. If updated information is not conveyed between service providers, conflicts may arise such that the travel services to be provided by two or more travel service providers are mutually exclusive, and the customer may end up holding reservations or tickets for services that he or she will not be able to use. Therefore in order to function as smoothly as possible for the customer, it is necessary that changes made to a customer's itinerary on one system are communicated to other systems so that conflicts may be promptly identified and either automatically resolved, or brought to the attention of the customer or agents of the operator system 50 so that steps can be taken to resolve them.

Figure 4A:
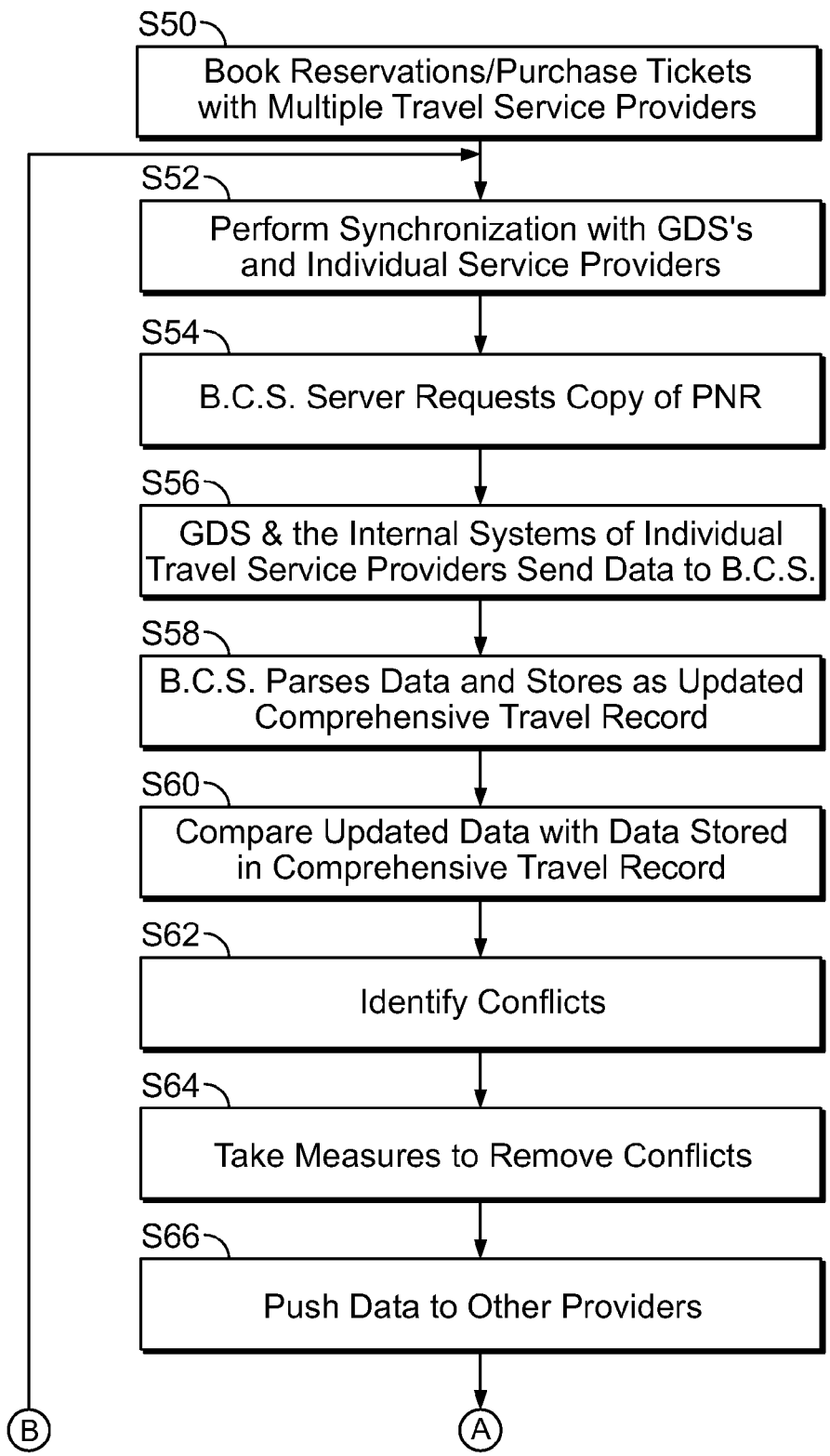
FIG. 4A is a flowchart of a method for synchronizing travel data according to the embodiment of the invention.
Figure 4B:
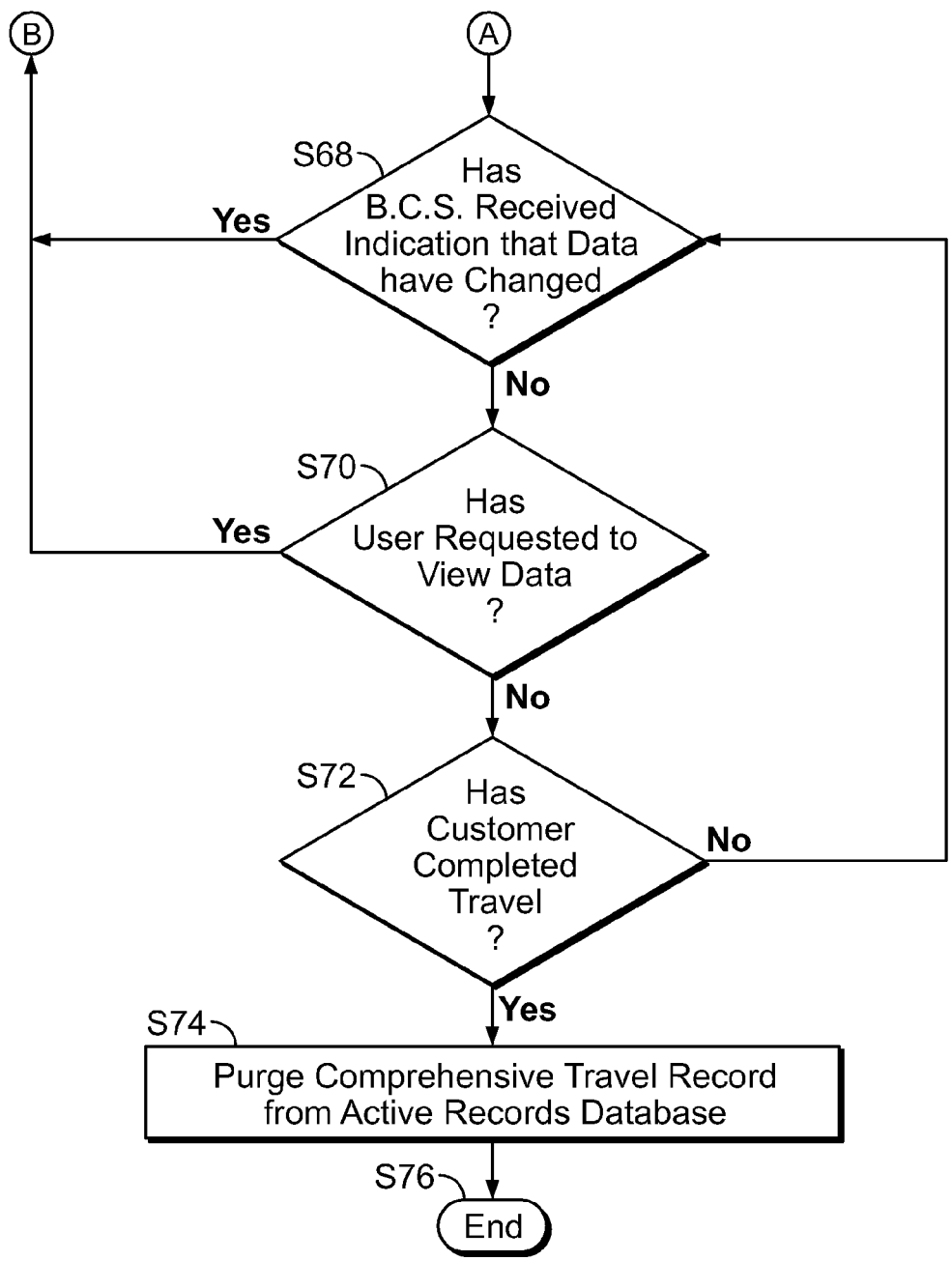
FIG. 4B is a flowchart of a method for synchronizing travel data according to the embodiment of the invention.

FIGS. 4A and 4B show a flow chart of a method for synchronizing data across multiple system platforms. The flow chart of FIGS. 4A and 4B will be described in conjunction with the system 50 of FIG. 3. It should be noted, however, that the data synchronization method of the present invention may be practiced on systems configured other than as shown in FIG. 3. The data synchronization method begins at step S50 where reservations are booked and tickets purchased in the manner described above with regard to the purchase of airline tickets. However, in this embodiment reservations are also made for hotels, rental cars, and the like. Reservations for these other travel related services may be placed through centralized GDS-like systems dedicated to specific travel services, such as Pegasus, a GDS-like system 68 for hotel reservations, and a, GDS-like system 74 for rental car reservations. Alternatively, reservations can be booked directly with the internal reservations systems of the various providers of these services, such as individual hotel reservation systems 70, 72 and individual rental car company reservation systems 76, 78, and the systems of other travel service providers 80. According to the system 50, tickets are purchased and reservations are booked by a customer through a web browser 52 connected to a computer network 54. The customer interacts with a system web site stored on the web server 56, and the web server searches for available services and rates, and requests to book reservations through the BCS server 58. The BCS server 58 in turn interacts with the various GDS or GDS-like systems, or directly with the internal systems of the various service providers to actually book the customer's reservations with the various travel service providers.

As with the previous embodiment, all of the data regarding the customers travel arrangements either originate in or pass through the BCS server 58. Thus, a truly comprehensive travel record detailing all of a customer's travel arrangements may be accumulated by the BCS server 58 and stored in the central data base 60.

Once the tickets are purchased and the reservations booked in step S50, the synchronization process proceeds to step S52 in which the BCS server 58 synchronizes the data in the comprehensive travel record. At step S52 the BCS server 58 requests a copy of the PNR data from the various GDS or GDS-like systems 62, 68, 74, or requests travel data directly from the internal systems of the various travel service providers 64, 66, 70, 72, 76, 78. The various GDS and GDS-like systems and the internal reservations and booking systems of the travel service providers respond by transmitting the requested PNR or travel data to the BCS server 58 at step S56. At step S58, the BCS server 58 parses the received data and stores the updated data as an updated comprehensive travel record. The new data are compared to the old data, and if discrepancies are discovered the old data are overwritten by the updated data at step S60.

Next, at step S62 the data from the various sources are compared to determine whether there are any conflicts. Conflicts may take the form of air travel dates that don't align with the dates of hotel reservations, or hotel reservations at more than one hotel for the same date, dinner reservations booked for the same time as an air travel segment, and the like. If conflicts are found in step S62, measures are taken in step S64 to remove the conflicts. Measures to remove conflicts may include automatically rebooking reservations in order to fit activities into a coherent an practicable schedule. Or merely generating an alert which notifies the customer or a customer service agent of the operator of the system 50, indicating that there is a conflict that must be resolved. In this later case, either the customer or the customer service agent may then take manual steps such as rebooking, canceling, or otherwise rescheduling one or more of the various travel related activities in order to eliminate the identified conflict or conflicts.

Next, at step S66 the BCS server 58 pushes data to the various internal systems of the travel service providers and the various GDS and GDS-like systems so that the data stored on these systems reflect any changes made to the customers travel arrangements. The data pushed to the various systems are tailored by the BCS server 58 such that the data supplied to the various systems are limited to the data required by the particular system. For example, an upgrade for the type of rental car reserved by a customer need not be communicated to the hotel at which the customer has reservations. However, if the number of passengers traveling with a customer changes, that information may be important to the hotel, the airline, and perhaps other travel service providers as well. Thus, the internal systems of the various travel service providers only receive data that are related to or relevant to the services they supply.

Once the updated data have been pushed to the systems of the various travel service providers, the synchronization process moves on to step S68 where a determination is made whether the BCS server 58 has received an indication that data from the various travel service providers have changed. The methods whereby such an indication may be provided to the BCS server 58 are manifold, including a direct contact from a customer service representative of the operator of the system 50, a reciprocal updating signal, and others. If the BCS server 58 receives an indication that data have changed in one or more of the GDS or GDS-like systems, or in the internal systems of the individual travel service providers, then process flow returns to step S52 where the synchronization process repeats itself. If the BCS server 58 has not received an indication that data have changed at step S68, the synchronization process moves to step S70 where a determination is made whether the customer has made a request via the network 54 to view his or her travel arrangements. If such a request has been made process flow returns step S52, and the synchronization process is repeated. Again, as with the previously described method of synchronizing travel data, re-synchronizing the data each time a customer requests to view his or her travel data may prove to be too taxing for system resources, and step S70 may be omitted, or somehow limited so that re-synchronizing occurs less frequently than each time the customer requests to view data. If step S70 is omitted, or if there has been no request to view the customer's travel data, the process moves on to step S72 where a determination is made whether the customer has completed his or her travel. If the customer has not yet completed his or her travel, the process moves back to step S68 where the system continues to monitor whether the BCS server 58 has received an indication that any of the data have changed or whether the customer has requested to view his or her travel arrangements (if step S70 is executed). If at step S72 it is determined that the customer has in fact completed his or her travel, the customer's comprehensive travel record is purged from the active records stored on the central database 60 or otherwise indicated as inactive so that future re-synchronizing functions are prevented, and the synchronization process ends at step S76. Thus, the system 50 and the method described in the flow chart of FIGS. 4A and 4B maintain synchronized travel data for a customer across multiple platforms. Furthermore, the system maintains a centralized record of a customer's travel plans such that conflicts between one or more travel activities can be identified and resolved in a timely and efficient manner.

While a preferred embodiment of the present invention has been described using specific terms, such description is for illustrative purposes only, and it is to be understood that changes and variations may be made without departing from the spirit or scope of the following claims.

What is claimed is:

1. A computer implemented data synchronization method for coordinating a passenger's travel requirements among a plurality of travel service providers, the method comprising the steps of a travel-related server:

receiving a search request from a passenger computer and sending search results to the passenger computer based on the search request;

receiving a booking request from the passenger computer based on the search results and creating a comprehensive travel record based on the booking request;

maintaining a central database for storing the comprehensive travel record, the comprehensive travel record including data related to the travel services to be provided by the plurality of travel service providers;

receiving data indicating a change in the travel services to be provided by a first travel service provider of the plurality of travel service providers and requesting and receiving copies of passenger name records associated with the travel services to be provided by the other travel service providers from the other travel service providers in response to the receipt of the data;

determining whether the change in the travel services to be provided by the first travel service provider affects the travel services to be provided by the other travel service providers by comparing the comprehensive travel record to the passenger name records received from the other travel service providers in response to the receipt of the data;

changing the travel services to be provided by the other travel service providers to accommodate the changes to the travel services to be provided by the first travel service provider; and updating the comprehensive travel record stored in the central database to reflect the changes to the travel services to be provided by the first travel service provider and the other travel service providers.

2. The method of claim 1 wherein at least one of the travel service providers is a commercial airline and the travel services provided by the airline include at least one flight segment.

3. The method of claim 1 wherein at least one of the travel service providers is a hotel.

4. The method of claim 1 wherein at least one of the travel service providers is a rental car company.

5. The method of claim 1 wherein at least one of the travel service providers is a restaurant.

6. The method of claim 1 wherein at least one of the travel service providers is a cruise line.

7. A system for synchronizing a passenger's travel requirements among a plurality of travel service providers, the system comprising:

a central database adapted to store a passenger record, the passenger record including data related to the travel services to be provided by the travel service providers; and a server adapted to interface with a search provider, reservations and booking systems of said travel service providers, and the central database, the server performing searches for travel services and reserving and booking travel services provided by the plurality of travel service providers, the server further receiving updated data from the reservations and booking systems of a first travel service provider of the plurality of travel service providers relating to changes in the services provided by the first travel service provider, requesting and receiving copies of passenger name records from the other travel service providers in response to the receipt of the updated data, and storing the updated data in the database and wherein the server:

determines whether the updated data affects the travel services to be provided by the other travel service providers by comparing the passenger record to the passenger name records received from the other travel service providers in response to the receipt of the updated data;

changes the travel services to be provided by the other travel service providers to accommodate the changes to the travel services to be provided by the first travel service provider; and updates the passenger record stored in the central database to reflect the changes to the travel services to be provided by the first travel service provider and the other travel service providers.

8. The system of claim 7 wherein at least one of the travel service providers is a commercial airline and the travel services provided by the airline include at least one flight segment.

9. The system of claim 7 wherein at least one of the travel services providers as a hotel.

10. The system of claim 7 wherein at least one of the travel services providers is a rental car company.

11. The system of claim 7 wherein at least one of the travel services providers is a restaurant.

12. The system of claim 7 wherein at least one of the travel services providers is a cruise line.

* * * * *